W. H. KEEP.
Carriage and Wagon Wheels.
No. 156,167. Patented Oct. 20, 1874.
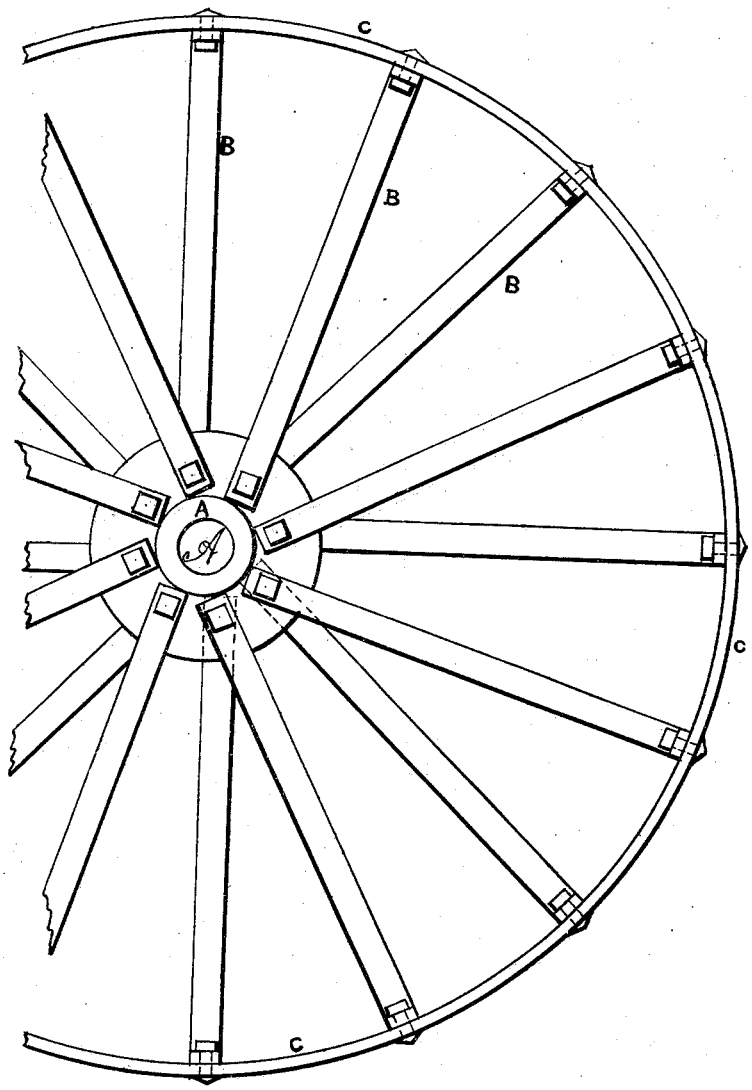
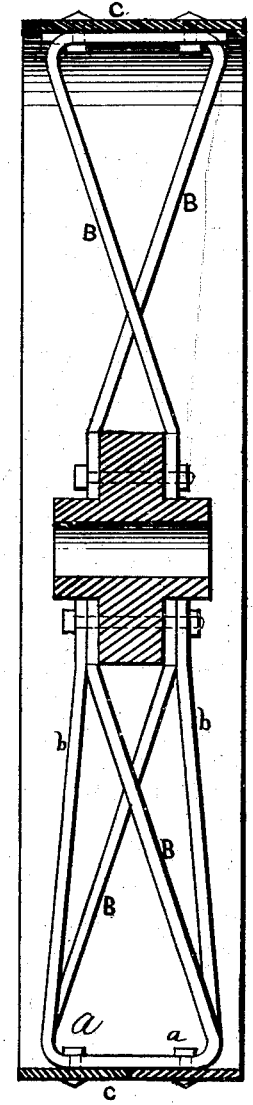

UNITED STATES PATENT OFFICE.

WILLIAM H. KEEP, OF STOCKTON, CALIFORNIA, ASSIGNOR OF ONE-HALF HIS RIGHT TO THOMAS CRUTTENDON WALKER, OF SAME PLACE.

IMPROVEMENT IN CARRIAGE AND WAGON WHEELS.

Specification forming part of Letters Patent No. 156,167, dated October 20, 1874; application filed June 4, 1874.

*To all whom it may concern:*

Be it known that I, WILLIAM HENRY KEEP, of Stockton, State of California, have invented a Wheel for Traction-Engine or Other Vehicle, of which the following is a specification:

The object of my invention is to construct a wheel of metal, so thoroughly braced in all directions as to be capable of sustaining heavy loads, and at the same time admit of power being applied at the hub of the wheel or to the shafts on which it is mounted.

That others may understand the construction and operation of my invention, reference is had to the accompanying drawings, in which—

Figure 1 is a plan view, and Fig. 2 is a vertical section.

A is the hub; B B, &c., the spokes; C, the tire. The hub A is provided with gains at each end to receive the spokes. These gains are arranged in pairs opposite and inclined to each other, so as to admit of two spokes being fastened to the hub by means of one rivet or bolt, and allow them to cross and diverge to their proper places in the rim of the wheel, where they are again bent to provide for fastening to the tire; and if the wheel is required to sustain great weight, they may be again bent and continued back to the hub, as shown at *a b*, Fig. 2.

It is evident that the rim or tire may be made of one or more pieces, and either welded or riveted or bolted together.

I claim as my invention—

The combination, in a wheel, of a hub provided with gains at each end to receive the spokes, in pairs opposite and inclined to each other, to admit of their being fastened to the hub by means of one bolt, and allow them to cross and diverge to their proper places on the rim of the wheel, to brace, inclined both to the axis of motion and the plane of the wheel, as set forth.

WILLIAM HENRY KEEP.

Witnesses:
    NATHANIEL CLARK,
    BENJAMIN STRAWBRIDGE.